United States Patent [19]
Bachman et al.

[11] 3,723,546
[45] Mar. 27, 1973

[54] SELECTIVE PRODUCTION OF NITRO ALKANES

[75] Inventors: Gustave Bryant Bachman; Robert Joseph Maleski, both of Lafayette, Ind.

[73] Assignee: Purdue Research Foundation

[22] Filed: Sept. 17, 1971

[21] Appl. No.: 181,561

[52] U.S. Cl. .............260/644, 260/488 F, 260/638 N
[51] Int. Cl. ..............................................C07c 79/04
[58] Field of Search......260/488 F, 488 J, 638 N, 644

[56] References Cited

UNITED STATES PATENTS 3,485,875 12/1969 Menapace .......................260/644 X
3,534,112 10/1970 Tindall..........................260/638 N X

FOREIGN PATENTS OR APPLICATIONS 143,787   1/1962   U.S.S.R. ...............................260/644

OTHER PUBLICATIONS

Tindall. Ind. Eng. Chem. Vol. 33, No. 1, pp. 55 to 56, Jan. 1941 (TP1A58).

*Primary Examiner*—Leland A. Sebastian
*Attorney*—Howard E. Post et al.

[57] ABSTRACT

A process for the selective production of nitroalkanes by condensing a lower nitroalkane with an aldehyde to produce the corresponding nitroalcohol or diol, esterifying same, and reducing the ester group with sodium borohydride.

1 Claim, No Drawings

SELECTIVE PRODUCTION OF NITRO ALKANES

BACKGROUND OF THE INVENTION

This invention relates to the selective production of nitro compounds. In a particular aspect, this invention relates to a process for the production of higher molecular weight nitroalkanes from lower molecular weight nitroalkanes.

It is known in the art to produce nitroalcohols and diols by reacting nitroalkanes with aliphatic or aromatic aldehydes in the presence of an alkaline material and a solvent. Primary nitroalkanes yield mono and dihydroxy compounds with one or two moles of aldehyde, respectively, and nitromethane yields the triol with 3 moles of aldehyde. Secondary nitroalkanes yield only monohydroxy compounds. This process gives excellent results when the aldehyde is formaldehyde, but with higher-molecular weight aldehydes, the yields are poor. Nitroalcohols and diols prepared from formaldehyde have been commercially available for many years.

Nitroalkanes are produced commercially by the vapor phase nitration of propane, yielding nitromethane, nitroethane, and 1- and 2-nitropropane and small amounts of 1- and 2-nitrobutane. Vapor phase nitration of alkanes of higher molecular weight than propane has not been satisfactory because of the large number of nitroalkanes obtained, along with by-products, which are very difficult to separate satisfactorily and economically. Liquid phase nitration of alkanes has long been known and has been used to produce, e.g., nitrocyclohexane. However the immiscibility of alkanes and nitric acid results in poor contact between the reactants so that yields are low. Furthermore, unless a relatively pure alkane is used, the nitrated mixture is very difficult to separate satisfactorily. Yet pure alkanes are quite expensive due to the difficulty of separating the components of the alkane stream from refinery processes. Hence there has not heretofore been a satisfactory process for the selective production of nitroalkanes of higher molecular weight than nitropropane, except for nitrocyclohexane.

SUMMARY OF THE INVENTION

It is an object of this invention to provide a process for the selective production of nitro compounds.

It is another object of this invention to provide a process for the production of higher molecular weight nitroalkanes from lower molecular weight nitroalkanes.

Other objects of this invention will be apparent to those skilled in the art from the disclosure herein.

It is the discovery of this invention to provide a process for the selective production of a nitroalkane corresponding to the formula

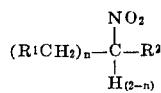

where $R^1$ can be hydrogen or alkyl of 1–10 carbon atoms, $R^2$ can be hydrogen or alkyl of 1–10 carbon atoms, and $n$ is 1 or 2. These nitro compounds are produced from a lower molecular weight nitroalkane by the steps of reacting the lower molecular weight nitroalkane with an aliphatic aldehyde in the presence of powdered sodium hydroxide or triethylamine thereby forming a nitroalcohol or nitrodiol. The nitroalcohol, or diol, is then esterified by known methods with a suitable acid or anhydride and the ester thereby formed is reduced with sodium borohydride to form the selected nitroalkane.

The process of the present invention is highly advantageous in that the synthesis can be carried out in a single reaction vessel, thus eliminating the need to isolate intermediates, and thereby reducing operating costs and preventing reduced yield through loss of product.

DETAILED DISCUSSION

In the process of the present invention, a nitroalkane corresponding to the formula: $R-CH_2-NO_2$, where R can be hydrogen or alkyl of 1 to about 9 carbon atoms, is reacted with $n$ moles of an aldehyde corresponding to the formula $R^1CHO$ where $R^1$ is hydrogen, or alkyl of 1 to about 10 carbon atoms, and $n$ is 1 or 2 to produce a nitroalkanol or a nitroalkanediol corresponding to the formula

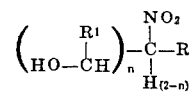

It has been discovered that high yields from higher aldehydes, e.g., where $R^1$ is alkyl, are readily achieved by eliminating the solvent taught by previous workers and gradually introducing the catalyst, 5 mole percent based on the nitroalkane, to the nitroalkane at 0°–5°. Comminuted sodium hydroxide, preferably, or triethylamine are suitable catalysts. The aldehyde is then added to the catalyzed mixture at 0°–5° and the mixture is permitted to gradually come to room temperature. The end of the reaction is marked by a disappearance of the infra-red spectral band of the carbonyl group.

The nitroalcohols and nitrodiols have many uses and the process of this invention makes it possible to prepare novel products or to prepare in good yield previously known ones. Advantageously, therefore, the nitroalkanols and diols can be recovered and purified by conventional methods if desired.

Unless the nitroalkanol or diol is to be recovered, it is esterified by conventional methods to form the ester or diester, usually, but not necessarily, with acetic anhydride, in accordance with the following procedure.

The mixture is again cooled to 0°–5° and for each equivalent of catalyst previously added there is added 4 equivalents of a mineral acid, e.g., hydrochloric or, preferably, sulfuric. The mixture is warmed to about 10° and 1 molar equivalent of acid anhydride, preferably acetic anhydride, is added per mole of aldehyde previously added.

The mixture is allowed to stand at about 0° to about 60°, preferably about 30°–40° for about 30 minutes. The resulting ester is then reduced by mixing with a stoichiometric excess of sodium borohydride dissolved in, e.g., dimethysulfoxide or dimethylformamide. The reactants are mixed well and allowed to stand for about 30–60 minutes at about 0°–50°, preferably 20°–30°. Water is then added to quench the reaction and the nitroalkane thereby obtained is separated by any convenient means, e.g., by distillation, crystallization, or by solvent extraction.

These higher nitroalkanes have many uses. They are particularly useful as high boiling solvents or fugitive plasticizers in lacquers and inks based on cellulose esters and ethers, e.g., nitrocellulose, cellulose acetate and ethyl cellulose. Generally they are used at a concentration of 1–5 percent by weight of cellulose ester or ether, depending on the effect desired.

The nitroalkanes useful as the starting materials of the present process include primary nitro compounds, e.g., nitromethane, nitroethane, and 1-nitropropane. These compounds are commercially available and the usual commercial materials are suitable. However one advantage of the present invention is that a primary nitro compound product produced by the process of the present invention can be used as an intermediate for the preparation of another nitro compound. Thus 1-nitrohexane can be prepared in a good yield from n-pentanal and nitromethane and be employed as the starting nitroalkane in producing 2-nitroheptane.

Aldehydes suitable for the practice of this invention include but are not limited to aliphatic aldehydes generally of about 1 to 10 carbon atoms including formaldehyde, acetaldehyde, propionaldehyde, butyraldehyde, pentanal, 2-ethylhexanal, and decanal. Higher molecular weight aldehydes can also be used as desired.

The catalysts employed in the step of preparing the nitro-alcohol or diol are preferably comminuted sodium hydroxide or triethylamine, which provide far higher yields than other catalysts which have been previously been recommended. Potassium hydroxide, for example, is relatively unsatisfactory. The addition of catalysts, especially sodium hydroxide, should be made gradually and with careful temperature control. If the addition is too rapid, the heat generated can cause the nitrohydrocarbon to ignite. Commercial grade sodium hydroxide, comminuted, and triethylamine are suitable for the practice of this invention.

The preferred aliphatic acid anhydrides used for the esterification step, include acetic, propionic, butyric, etc. The acid portion of the ester is recoverable as byproduct, but there is no advantage in using the higher molecular weight acids for esterifying the nitroalcohol. Hence the particularly preferred anhydride is acetic because it is the most economical.

Sodium borohydride and suitable solvents therefor, e.g., dimethyl sulfoxide and dimethyl formamide, are commercially available and the usual commercial grades are suitable for the practice of this invention. The sodium borohydride is employed at a concentration of, e.g., from 2–10 percent by wt. in the solvent, preferably about 4–6 percent. A stoichiometric excess is required for reduction of the ester. The stoichiometric amount is 1 mole of sodium borohydride per 2 moles of ester. About 1.1–1.5 moles provides ample excess.

The invention will be better understood by reference to the following examples. It is understood however that the examples are intended for illustration only and it is not intended that the invention be limited thereby.

EXAMPLE 1

To a 300 ml 3-nick flask equipped with an overhead stirrer, a pressure-equalizing dropping funnel with drying tube and a thermometer, there was delivered 15.0 g (0.2 mole) of nitroethane. It was cooled to within 5°–10° in an ice bath and 0.40 g (0.01 mole) of powdered sodium hydroxide was added in small increments. n-Pentanal, 17.2 g (0.2 mole) was slowly added over a period of 20 minutes. The temperature of the mixture was then allowed to rise to 25°C over a 16 hour period. The mixture was then carefully acidified with 1.30 g (0.013 mole) of concentrated sulfuric acid cooled to 5°–10C.

To the contents of the flask was slowly added 20.6 g (10 ml, 0.2 mole) of acetic anhydride maintaining the temperature within 30°–40° with an ice bath as needed. To the flask and contents were then added over a period of 45 min. 5.50 g (0.140 mole, 97 percent) of sodium borohydride dissolved in 100 ml of dimethyl sulfoxide (DMSO). The temperature was maintained in the range of 20°–25°C and vigorous stirring was employed throughout. The reaction was conducted for an additional 30 min. and the reaction mixture was poured into 75 ml of water-ice mixture which had a 20 ml layer of ethyl ether. The liquid layers were separated and the aqueous layer was extracted three more times with 20 ml portions of ether. The ether extracts were combined in a flask and dried with anhydrous magnesium sulfate. The conversion was 70 percent to 2-nitroheptane.

EXAMPLE 2

A sample of 2-nitro-1-butanol, which is commercially available, was esterified following the procedure of Example 1. To a 100 ml 3-neck flask equipped with a thermometer, a Teflon-coated stirring bar, and a pressure-equalizing dropping funnel with drying tube was delivered 20 ml of DMSO. Sodium borohydride, 0.55 g (0.014 mole, 97 percent) was dissolved therein and the 2-nitro-1-butyl acetate, 3.22 g (0.02 mole) dissolved in 1.2 g (0.02 mole) of acetic acid was added through the dropping funnel with constant agitation. The temperature was maintained in the range of 20°–25°C by cooling in an ice bath as needed. After 1 hour of reaction time, the reaction was quenched and the product extracted as described in Example 2. The conversion of ester to 2-nitrobutane was determined to be 76 percent.

EXAMPLE 3

A 300 ml 3-neck round bottom flask equipped with a drying tube, Teflon-coated magnetic stirring bar, a dropping funnel with an external inlet and a dry ice condenser on top was charged with 12.2 g (10.8 ml, 0.2 mole) of nitromethane and 1.01 g (1.4 ml, 0.01 mole) of triethylamine. The solution was cooled in an ice bath and an equimolar amount of acetaldehyde (8.8 g, 11.3 ml) was distilled into the addition funnel and added all at once to the contents of the flask. The reaction solution was allowed to come to room temperature overnight (16 hr) during which time it turned from clear to a dark red-orange. At the end of this period, 1.30 g of conc. $H_2SO_4$ (0.013 mole) was added at 5°–10° followed by 19.0 g (0.202 mole) of acetic anhydride at 30°–40. The acylated material was allowed to come to room temperature over 0.5 hr and 120 ml of a DMSO solution containing 6.00 g (0.150 mole, 95 percent) of sodium borohydride was added to the solution at 20°–25 over 0.5 hr. An ice bath was used to control the temperature.

The solution was poured onto 300 ml of ice and water layered over with 30 ml of ether. The layers were separated and the aqueous layer was extracted with 3 × 4 ml portions of ether. The ether solutions were combined, back-washed with 3 × 50 ml portions of water and dried over anhydrous magnesium sulfate. The ether was removed through a short column and the residue was distilled through a 6 in. column packed with 1/8 in. glass helicies and equipped with a variable reflux take off head. There were obtained 1-nitropropane and 3-nitropentane. The 3-nitropentane was identified by its spectra: ir(neat) 6.45, 7.50 $\mu$; nmr (CDCl$_3$) $\delta$ 4.25 (m, 1, CHNO$_2$) 1.85 [m, 4,0$_2$NCH-(CH$_2$] 1.0 (t, 6, CH$_3$).

EXAMPLE 4

The experiment of Example 3 was repeated in all essential details except that two molar equivalents of acetaldehyde were used instead of one. The yield of 3-nitropentane was more than twice that obtained in Example 3. Some physical properties are given in the table.

EXAMPLE 5

The experiment of Example 1 was repeated in all essential details except that nitromethane, 24.2 g (0.4 mole), was substituted for nitroethane and 4.44 g (0.110 mole, 95 percent) of sodium borohydride was employed. The conversion to 1-nitrohexane based on the nitromethane was 79 percent and based on pentanal was 85 percent.

EXAMPLE 6

1-Nitropropane, 17.8 g (0.2 mole), was cooled in a flask to 0°–5° in an ice bath. Powdered sodium hydroxide, 0.4 g (0.01 mole), was added in small increments. n-Pentanal, 17.2 g (0.2 mole) was added over 30 minutes. The reaction mixture was allowed to come to room temperature over a period of 16 hours. It was then cooled to 5°–10°C and very slowly acidified with concentrated sulfuric acid, 1.30 g (0.013 mole). The flask was removed from the ice bath and acetic anhydride, 20.6 g (0.202 mole), was added at a rate such that the temperature remained below 40°C. The mixture was stirred 30 min. and 100 ml of a DMSO solution containing sodium borohydride, 5.50 g (0.14 mole, 97 percent) was added over a 30 min. period. The temperature was maintained within the range of 20°–25° C by means of an ice bath as needed. The reaction was continued another hour with stirring and was then quenched and the product extracted in accordance with Example 1. There was obtained 3-nitrooctane, 70 percent conversion based on pentanal which was separated by distillation. It had the properties given in Table 1.

EXAMPLE 7

1-Nitrobutane, 51.5 g (0.5 mole), 25 ml of 95 percent ethanol, and 2 ml of 5 N sodium hydroxide solution were placed in a 300 ml 3-neck flask equipped as set forth in Example 4 except that a reflux condenser, protected from moisture by a drying tube, was used. Pontanal, 43 g (0.5 mole), was then added with the aid of external cooling at 30°–35°. After the addition was approximately 2/3 finished an additional 2 ml of 5 N sodium hydroxide solution was added and the solution was allowed to stand for 4 days. The solution was acidified with aqueous hydrochloric acid, filtered, and distilled. There was obtained 69.4 g (74 percent conversion) of 4-nitro-5-nonanol.

Acetic anhydride, 20.4 g (0.2 mole), was added to a solution of 4-nitro-5-nonanol, 37.8 g (0.2 mole), and 5 drops of concentrated sulfuric acid. The temperature was regulated at 30°–40° by means of an ice bath. The solution was allowed to stand 0.5 hr. at room temperature and 100 ml of a DMSO solution containing sodium borohydride, 5.50 g (0.142 mole), 95 percent, was added over 20 min. at 20°–25°. There was obtained a 71 percent conversion to 4-nitrononane. It was separated by distillation and had the properties given in Table 1.

EXAMPLE 8

The experiment of Example 6 was repeated in all essential details except that nitromethane was substituted for 1-nitropropane and 2-ethylhexanal was substituted for pentanal in equimolar ratios. There was obtained 3-ethyl-1-nitroheptane, 66 percent conversion. The distilled product had the properties given in Table 1.

EXAMPLE 9

The experiment of Example 8 was repeated in all essential details except that nitroethane, 0.04 moles, was substituted for nitromethane and 0.002 mole of sodium hydroxide and 0.01 mole of 2-ethylhexanal were used. There was obtained a 23 percent conversion of the aldehyde to 4-ethyl-2-nitrooctane.

TABLE 1

| Ex. No. | Product | b.p. | $n^{20}_D$ | $d^{24}$ |
|---|---|---|---|---|
| 1 | 2-Nitroheptane | 67–70 at 1.25 mm | | |
| 4 | 3-Nitropentane | 64–65 at 29 mm | | |
| 5 | 1-Nitrohexane | 80–81 at 14 mm | 1.4214 | |
| 6 | 3-Nitrooctane | 64–65 at 0.25 mm | 1.4240 | |
| 7 | 4-Nitrononane | 55–58 at 0.2 mm | 1.4266 | 0.9823 |
| 8 | 3-Ethyl-1-nitroheptane | 66–67 at 0.05 mm | 1.4359 | 0.9113 |
| 9 | 4-Ethyl-2-nitrooctane | 62–63 at 0.1 mm | 1.4336 | 0.8975 |

EXAMPLE 10

The experiment of Example 1 is repeated in all essential details except that the 1-nitrohexane prepared in Example 5 is substituted for nitroethane and formaldehyde is substituted for n-pentanal. There is obtained 2-nitroheptane.

EXAMPLE 11

The experiment of Example 10 is repeated in all essential details except that the 1-nitroheptane therein prepared is substituted for 1-nitrohexane and n-pentanal is substituted for formaldehyde. There is obtained 6-nitro-dodecane.

EXAMPLE 12

The experiment of Example 3 was repeated in all essential details except that propanal was substituted for acetaldehyde on an equimolar basis. There was obtained 1-nitrobutane in a 60 percent yield.

EXAMPLE 13

The experiment of Example 4 was repeated in all essential details except that propanal was substituted for acetaldehyde on an equimolar basis. There was obtained 4-nitroheptane.

I claim:

1. A process for the preparation of a nitroalkane corresponding to the formula

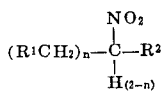

where $R^1$ is hydrogen or alkyl of 1 to 10 carbon atoms and $R^2$ is hydrogen or alkyl of 1–10 carbon atoms, and $n$ is 1 or 2, comprising:

a. mixing at 0°–5° a nitroalkane corresponding to the formula $R-CH_2-NO_2$ where R is hydrogen or alkyl of 1 to about 9 carbon atoms with dry comminuted sodium hydroxide or triethylamine in a mole ratio of about 20:1 b. adding an aldehyde corresponding to the formula $R^1CHO$ where $R^1$ is hydrogen or alkyl of 1 to about 10 carbon atoms in a ratio of 1–2 moles per mole of said nitro compound, allowing the temperature to rise to ambient temperature thereby forming a nitroalcohol or a nitrodiol, c. cooling to within about 0°–5° and adding thereto hydrochloric or sulfuric acid in a ratio of about 4 equivalents per equivalent of catalyst and allowing the temperature to rise to about 10°, adding an alkanoic anhydride in a mole ratio to said aldehyde of about 1:1, and allowing to stand at 0 to about 60° for about 30 minutes thereby forming an ester of said nitroalcohol or nitrodiol, d. mixing with a stoichiometric excess of sodium borohydride dissolved in dimethylsulfoxide and allowing to stand at 0°–50° for a period of time sufficient to produce said nitroalkane.

e. quenching with water, and f. recovering said nitroalkane.

* * * * *

UNITED STATES PATENT OFFICE
CERTIFICATE OF CORRECTION

Patent No. 3,723,546      Dated March 27, 1973

Inventor(s) BACHMAN, GUSTAVE BRYANT, ET. AL.

It is certified that error appears in the above-identified patent and that said Letters Patent are hereby corrected as shown below:

Column 4, line 3, "3-nick" should read -- 3-neck -- ; line 48, "Example 2" should read -- Example 1 -- . Column 5, line 19, "$\underline{C}HNO_2$" should read -- $\underline{C}HNO_2$ -- ; line 20, "$(\underline{C}H_2)$" should read -- $(\underline{C}H_2)_2]$ -- . Column 6, line 4, "Pontanal" should read -- Pentanal -- ; line 47, "Table 1, "1.4214" should read -- 1.4212 -- .

Signed and sealed this 25th day of December 1973.

(SEAL)
Attest:

EDWARD M. FLETCHER,JR.      RENE D. TEGTMEYER
Attesting Officer      Acting Commissioner of Patents